Aug. 18, 1942.  C. W. VOGT  2,293,182
SHIPPING AND DISPENSING CONTAINER
Original Filed Sept. 26, 1936   2 Sheets-Sheet 2
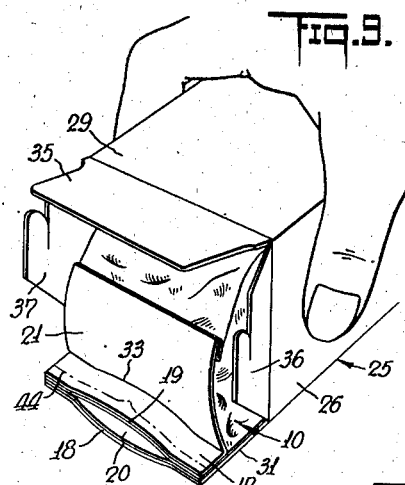
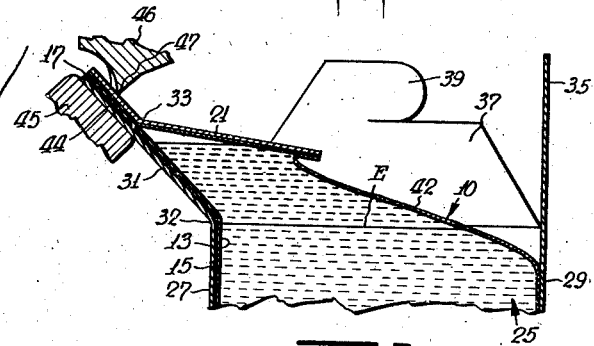
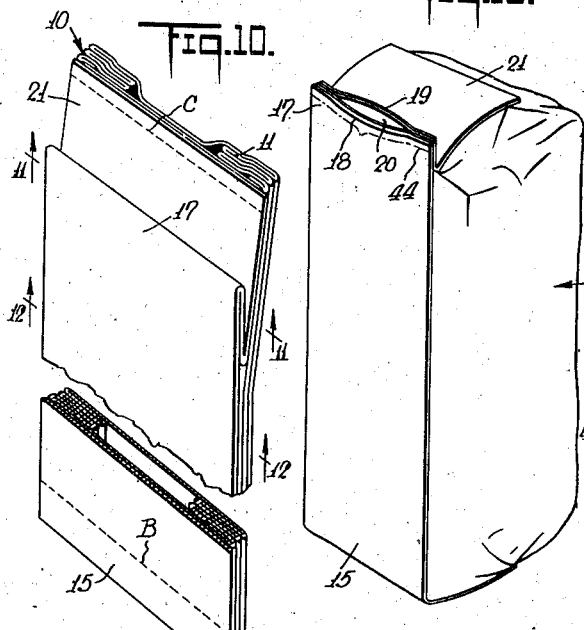
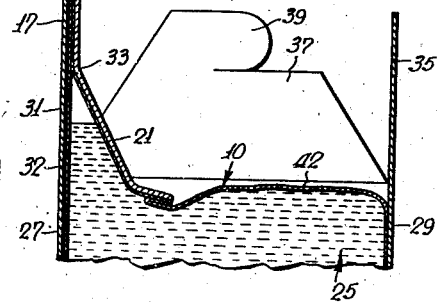
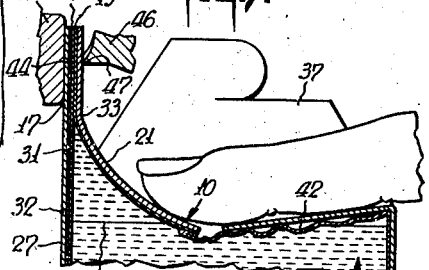
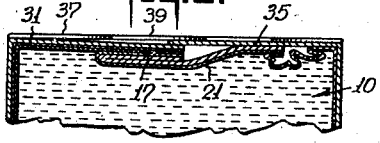
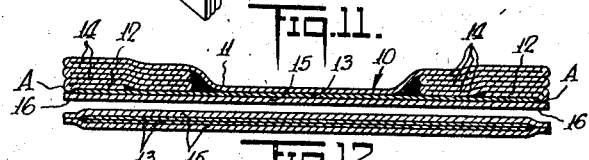
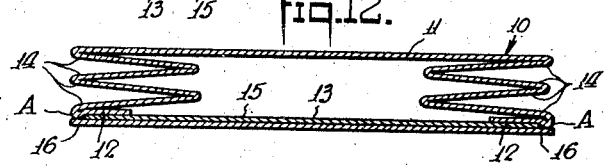
INVENTOR
*Clarence W. Vogt*
BY
ATTORNEYS Patented Aug. 18, 1942

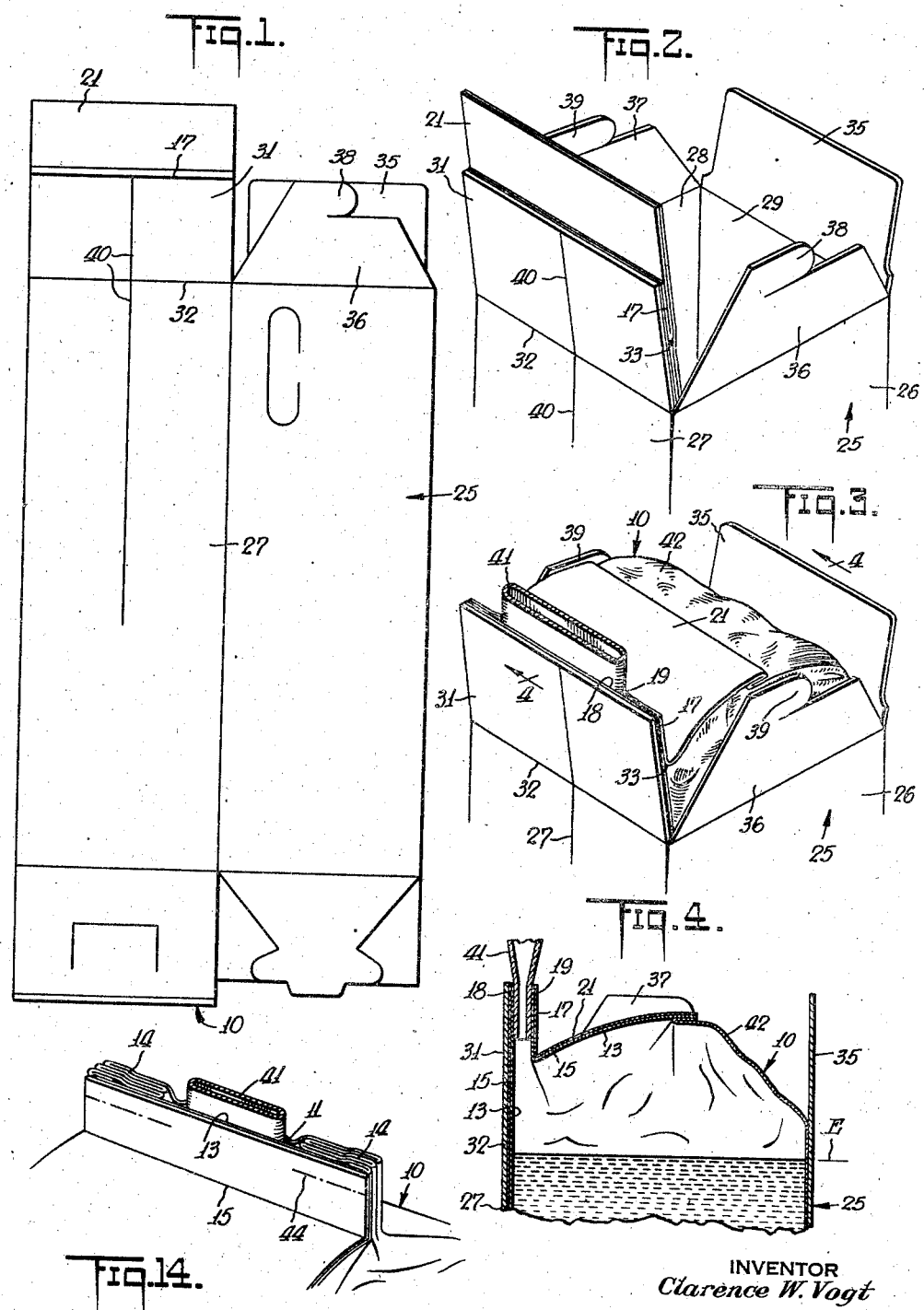

2,293,182

UNITED STATES PATENT OFFICE 2,293,182

SHIPPING AND DISPENSING CONTAINER

Clarence W. Vogt, Norwalk, Conn.

Original application September 26, 1936, Serial No. 102,682. Divided and this application February 23, 1939, Serial No. 257,926

7 Claims. (Cl. 229—14)

During the filling of containers with certain liquids, such as milk or cream, foam is formed in the container above the surface of the liquid. In the case of a relatively rigid walled container such as a milk bottle, no head space is necessary to receive the foam since the bottle itself serves as a measure of the liquid, and the foam may be made to overflow at the top during the filling operation, or it may be sucked out or permitted to settle, and further liquid may be added to insure the required filling of the container to the top. However, in the case of flexible walled containers, the upper end thereof does not constitute a definite filling level for the liquid, and it is not practical to have the foam overflow or to add liquid to replace settled foam if it is desired to store or ship a definite volume of liquid. Therefore, it is essential to accurately measure the liquid before delivery, and to have a considerable head space to receive said foam.

This head space is of decided disadvantage as it not only increases the bulk of the container materially, but also permits the surging of the liquid therein, so that during transportation, the liquid is jolted back and forth against the walls of the container. If the liquid is cream, this churning action causes the formation of butter particles or the formation of the so-called cream plug. Also the pounding of the semi-flexible container walls by the surging action of the liquid tends to disrupt the container and strain or rupture the inner bag. Furthermore, the presence of excess air in the head space causes undesirable oxidation of the liquid and increases the speed of spoilage of certain liquids, such as milk or cream. The head space has a further disadvantage in that the customers will believe that the containers are incompletely filled and that they are receiving less than they are entitled to.

If the container be of the rigid type, such as that of paraffine coated paper, the head space cannot be eliminated by any infolding of the upper end of said container. In cases where the container comprises an inner flexible bag and an outer rigid carton of substantially the same height as the bag, the infolding of the upper end of the bag to eliminate head space is only of temporary benefit since the level of the liquid will necessarily be a substantial distance below the upper end of the carton to provide foam space during filling, and when the carton is closed the infolded portion of the bag will be distended by the ordinary handling of the container so that the head space in the container will be recreated.

One object of the present invention is to provide a container of the flexible wall type in which the head space may be eliminated, after the filling operation and prior to the sealing of said container, so that the container will have no appreciable head space during transportation.

Although the present invention may be embodied in different forms, it is herein shown as applied to containers which may be made and shipped in flat collapsed form, which may be readily set up and filled, and employed for the storage, shipment and dispensing of liquids. The present invention is also adaptable for use in containers for the storing and pouring of solids in powdered or granular form.

In accordance with certain aspects of the present invention, the container comprises an outer supporting structure, preferably a collapsible cardboard box or carton, and an inner expansible bag secured to said carton and made of thin flexible material of such character that the superposed layers or portions thereof may be readily sealed together.

As a feature of the present invention, the inner expansible bag and the outer carton are so constructed and so correlated that when the inner expansible bag is distended by the filling operation, a substantial portion of said bag will extend above the normal top of the body of the carton. This expansible bag may be filled up to or slightly below the level of the carton body, the portion of said bag above said carton body serving as a receiving space for the foam during the filling operation.

After the completion of the filling operation with a premeasured volume of liquid, and after the foam has settled or broken (this usually requires not over eight to ten seconds with the usual run of milk) the side panels of the carton may be squeezed sufficiently to displace the liquid upwardly into the head space above the carton and to dispel the air of the head space through the filling opening of the inner bag. While the container is in this condition, the filling opening of the inner bag is sealed so that when the liquid displacing pressure on the side panels of the carton is relieved, the liquid will resume its normal level, and the head space portion of said bag will collapse over said liquid.

Another method of eliminating the head space portion of the bag is to press down directly on the top of the bag or indirectly by infolding one or more closure flaps of the carton over the top of the bag after the completion of the filling operation, thereby deflating the head space and causing the collapse of the bubbles or foam. Those bubbles which are not collapsed or expelled by this infolding action will be forced or drawn back to the filling mechanism through the filling nozzle. Instead of infolding the upper portion of the expansible bag directly after the filling operation, the foam may be permitted to settle by the natural breaking of the bubbles before infolding said bag.

Another method which may be utilized either by itself or with one of the other two methods herein described, is to displace the air in the head space by means of water vapor or steam. This may be effected by injecting a small amount of steam into the head space in a manner to blow out or scrub out the air in the head space, and then when the steam nozzle is withdrawn quickly seal the filling opening of the bag. As the vapor condenses, the head space portion of the bag collapses as a result of the vacuum formed in said space. Although this last method may not be satisfactory for many products, it has been found satisfactory for milk.

With my improved type of construction, the expansible bag is permitted to be filled almost to the top of the carton, so that when the container is closed into a transportable unit, there will be little or no head space in the container. A container so constructed will eliminate the disadvantages above referred to.

In the specific embodiment of the invention hereinafter described, the flexible bag is formed at its mouth with a pair of parallel lips or wall sections which may be separated or bowed apart to form a filling opening, and which may be sealed together after the bag is filled and the head space is eliminated. By separating these lips or wall sections, they may serve as a pouring spout. These mouth lips of the flexible bag are preferably attached to an inner end closure flap of the carton to form a unit therewith which can be folded inwardly across the top of the carton when the container is closed.

The construction of the present invention is such that during the filling operation, the upper end of the carton must be open. During this filling operation, the flap to which the mouth lips are attached, is extended upwardly from the top of the carton body. As the expansible bag is filled through these mouth lips, the top of the bag will be inflated, and in filled sealed condition the top of said bag will extend transversely of the upstanding flap.

As a feature of the present invention, this flap is made of such a height that the base of the mouth lips will extend a substantial distance above the fold line of said flap, so that the top of the bag will define a deflatable head space of considerable volume about said fold line. The use of such a flap facilitates the closing of the carton, provides greater strength at the closure end of said carton, and facilitates the pouring of the liquid from the bag lips, since these lips, when in pouring position, will extend to the extreme outer end of the open carton.

The present invention is particularly advantageous for that type of bag which when collapsed has front and rear flat walls separated by side expansible infolds, and which is closed at its lower end by a transverse seam. If the inner fold edges of these infolds are near the longitudinal center line or axis of the bag, the center portion of the bottom seam of the bag, when filled and expanded, will be subjected to a great deal of stress due to the outward pull at the apex of the side infolds. The deeper the side infolds, the more difficult will be the outward distension of these infolds while the bag is being charged.

As another feature of the present invention, the bag is so constructed that when collapsed it comprises a pair of opposed flat wall members separated by more than one narrow infold extending from each side of the collapsed bag, so that the inner fold edges of these infolds will be spaced a substantial distance from the longitudinal axis or center line of the bag. This type of bag has the advantage of reducing the stress at the center portion of the bottom seam and is particularly advantageous for the purpose of the present invention since it will open more completely at the top during the filling operation and will thus provide additional foam space.

Further objects of the present invention will be apparent from a consideration of the specific form illustrated in the accompanying drawings, or will be made apparent from the following description. In these drawings:

Fig. 1 is a side elevation of one form of combined carton and inner bag in collapsed condition, Fig. 2 is a fragmentary perspective view showing the upper end of a combined carton and bag of Fig. 1, after being set up and just prior to the filling operation, Fig. 3 is a similar view after the completion of the filling operation and before the removal of the filling spout or nozzle, Fig. 4 is a section taken on the line 4—4 of Fig. 3, Fig. 5 is a section similar to Fig. 4, but showing the liquid displaced into the head space in the inner bag preparatory to sealing, Fig. 6 is a view similar to Fig. 5 but showing the bag sealed and the liquid level lowered, Fig. 7 is a similar section but showing another method of eliminating the head space in the inner bag prior to sealing, Fig. 8 is a vertical section through the upper end of the container and shows said container closed and ready for shipment, Fig. 9 is a fragmentary perspective view of the upper end of the container with the parts in position for dispensing, Fig. 10 is a perspective view of the inner bag in collapsed condition and before the fold between the mouth lips has been trimmed, Fig. 11 is a section taken on the line 11—11 of Fig. 10.

Fig. 12 is a section taken on the line 12—12 of Fig. 10 but showing the bag slightly expanded, Fig. 13 is a perspective view of the inner bag separate from the carton and shown in fully distended position and with a portion of the flap cut or trimmed to form a filling or dispensing spout, and Fig. 14 is a perspective view of the upper portion of an inner bag which may be used in carrying out my improved process.

It must be understood that the thicknesses of the various layers of the bag as shown in these drawings are somewhat exaggerated and that in practice all of these layers are very thin.

The bag is preferably made from thin flexible sheet material of strip form, progressively assembled to form an endwise advancing tube, progressively collapsed and sealed transversely at spaced points along the length thereof, and then transversely cut intermediate of the ends of the sealed portion to form a complete hermetically sealed and collapsed bag 10.

The bag is primarily made of such a material that when the layers are superposed and pressed together under heat they will weld, vulcanize or hermetically unite, and as an example of such material I may and preferably do employ a type of thin flexible transparent slightly elastic impervious material sold under the name of "Pliofilm," and made from a chlorinated rubber compound. This material has a thermoplastic characteristic of being readily vulcanized or sealed at a temperature of approximately 115° C. so that overlapped sections thereof may be sealed together by the application of heat and pressure, even though the surfaces have been previously wetted by contact with liquids or moist plastic materials. Another material which may be satisfactorily used in some constructions and for some materials is a moisture-proof cellulosic material of the type sold under the trade name "Heat Sealing Cellophane." So far as certain aspects of the invention are concerned, a thin sheet material having a waterproof coating such as that sold under the trade name "Koroseal" may also be used. Also, other flexible sheet materials may be used, which may be fabricated into a casing by the use of adhesive or solvents for sealably securing adjacent surfaces of said material together.

The sheet from which the bag is made will hereinafter be referred to as "Pliofilm," although it is to be understood that such a term for the purpose of this case and as far as many aspects of the invention are concerned, may include any suitable flexible sheet material.

In the construction shown in Figs. 10 to 13, the bag 10 is formed of a sheet of Pliofilm 11 having its side sections 12 heat sealed to the sides of a narrower sheet of Pliofilm 13 along its entire length to form a tube. The sheet 11 is tucked inwardly from the sides of the sheet 13 to form a pair of infolds 14 on each side of the collapsed bag. These infolds 14 are narrow so that the inner fold edges of one pair of infolds do not abut or overlap the inner edges of the opposite pair of infolds, and are spaced a substantial distance from the longitudinal axis of the bag. The bag 10 is shown having a square cross-section when expanded. If it is desired to form a container having a rectangular oblong cross-section, it is not necessary to provide a multiplicity of narrow infolds on each side of the bag, one narrow infold being all that is necessary on each side of said bag.

Cemented or otherwise secured to the Pliofilm sheet 13 to form a laminated wall therewith is a reinforcing sheet 15 made of paper or other flexible sheet material which will not be injuriously affected by the application of sufficient heat and pressure to effect sealing, fusing or vulcanizing of the Pliofilm.

In order that the corner of the bag 10 along the side edges of the sheet 15 be strong when in fully charged condition, said sheet 15 extends beyond the side edges of the Pliofilm sheet 13 to form marginal extensions 16, and portions of the side sections 12 of the Pliofilm sheet 11 project outwardly beyond the side edges of said sheet 13 and are directly glued or cemented at A to said marginal extensions. Such sealing by adhesive and by attachment of the sheet 11 directly to the paper sheet 15 at the corners, has a reinforcing effect which will compensate for any weakening resulting from heating and softening of the Pliofilm at said corners.

The tube forming the bag 10 is sealed at its lower end transversely across the entire width thereof and below the line B by heat sealing, so that all of the superimposed layers of the Pliofilm sheets are autogenously bonded together and to the sheet 13. The top of the tube forming the bag is similarly heat sealed transversely across the entire width beyond the line C so that the tube will be hermetically sealed at both ends and along the sides. These two end seals will each consist of two thicknesses of Pliofilm sealed together at the center, and seven thicknesses of Pliofilm sealed at the side edges.

In order to provide a mouth for the bag 10 the laminated wall of the flat tube is formed with a transverse pleat 17, the outer fold of which may be trimmed or slit to form a pair of parallel lips, flanges or walls 18 and 19 which may be separated or bowed apart to form a filling or pouring opening 20. When the bag is charged through the opening 20, it will be distended and expanded into the shape shown in Fig. 13 with the pleat 17 extending substantially in the plane of the laminated wall of the body of the bag, while the end portion 21 of the bag beyond the pleat will be folded inwardly at an angle to said laminated wall.

The bag 10 is hermetically sealed at the ends and sides, and the outer fold of the pleat 17 is untrimmed or unslitted during shipment and/or storage of the collapsed bag as shown in Fig. 10, so that the interior thereof may be maintained sterile, and protected against any possible contamination.

The bag in the collapsed position shown in Fig. 10 is secured within and attached to a collapsed carton 25 as shown in Fig. 1. This carton is of comparatively rigid material such as cardboard, and is of tubular form having side walls 26, 27, 28 and 29 which terminate in closure flaps at each end. The side walls of the carton are preferably of an inside width substantially equal to the width of the collapsed bag, and of a length to be determined by the amount of liquid to be stored therein.

The bag 10 is attached to one of the side walls of the carton 25 so that the entire weight of the bag and its contents does not press on the end closure flaps of the carton, and so that the bag and the carton may be shipped as a unit in collapsed predetermined relationship. For that purpose, the laminated side of the bag 10 may be cemented or otherwise adhesively secured to the side wall 27 of the carton, but preferably only to the flap at the upper end of said side wall. This wall 27 at its upper end is provided with an inner closure flap 31 foldable along a score line 32, and the pleat 17 is juxtaposed to said flap 31 and cemented or otherwise secured thereto substantially across its entire surface, with the outer uncut fold of said pleat extending a short distance beyond the upper end of said flap as shown in Fig. 1.

As an important feature of the present invention, the flap 31 is of such a length that the base 33 of the pleat 17 is disposed at a substantial distance beyond the fold line 32, so that when the bag 10 is filled and distended and while the carton 25 is still open, the top of said bag will extend transversely from said base 33 and above the top of the body of the carton 25 as shown in Figs. 3 and 4. In the specific form shown, the flap 31 has a length equal approximately to one-half the distance between the opposed carton walls 27 and 28, and the base 33 of the pleat 17 is located approximately halfway between the outer edge of said flap 31 and the fold line 32.

As an example of the dimensions of a quart size container that may embody the present invention, the carton 25 may be about 2¼ inches square and about 7⅝ inches long from closure to closure, the inner flap 31 may be 1⅜ inches long, and the base of the pleat 17 may be disposed ⅞ of an inch above the fold line of said flap.

Cooperating with the flap 31 to form a closure for the upper end of the carton 25 are an inner foldable flap 35 opposite the flap 31 and extending from the carton wall 29, and foldable outer closure flaps 36 and 37 extending respectively from the carton walls 26 and 28. The particular shape of the flaps 36 and 37 is not important for the purpose of the present invention, and for the purpose of illustration they are shown provided respectively with tabs 38 and 39 adapted to be tucked underneath the flap 35 when the carton is in closed position.

The bottom of the carton is provided with suitable closure flaps. The particular type of flaps shown does not form any part of the present invention and may be of the type shown in my copending application Serial No. 76,898, filed April 29, 1936, now Patent No. 2,167,917 issued August 1, 1939.

The combined bag and carton may be delivered from the place of manufacture in the flat collapsed condition shown in Fig. 1. Before filling, the outer fold edge of the pleat 17 is trimmed off beyond the outer edge of the flap 31 to form the mouth of the bag, the carton is expanded or set up, and the bottom flaps are closed, so that the combined bag and carton will have its parts in the position shown in Fig. 2 ready to be filled.

The separation of the two lips 18 and 19 is readily effected by pressing inwardly on the side walls 26 and 28. This operation causes the intermediate wall 27 to which the bag 10 is attached to be bulged outwardly and the lip 18 connected to said flap 31 to be similarly bulged. In order to facilitate the outward bulging of the wall 27 and the flap 31, these members may be provided with a medial longitudinal score line 40. After the lips 18 and 19 have been separated to form the opening 20 therebetween, shown in Fig. 13, a filling nozzle 41 is inserted into said opening while the bag is still in collapsed condition and substantially devoid of air. This absence of air in the bag during filling operations materially reduces the filling time of liquids, especially those producing foam.

Since the flap 31 is of substantial length, the outlet end of the nozzle 41 during the filling operation, will be located above the fold line 32, thus reducing the possibility of any dripping after the measured charge has been inserted. Another advantage of having the flap 31 as long as is indicated is that it permits said flap to be bent slightly outwardly along its fold line 32 during the opening of the bag lips and the inserting of the nozzle therebetween, so that the air is more effectively kept out of the bag before it receives its charge.

The filling of the bag causes said bag to be distended into the approximate condition shown in Figs. 3 and 4 with its upper portion 42 extending above the top of the body of the carton 25 and constituting a head space of substantial volume for receiving any foam which may be produced during the filling operation. With this construction, the carton and the bag 10 may be of such size that a predetermined volume of liquid will fill the bag almost to the very top of the body of the carton in the plane of the fold lines of the closure flaps and to the level E indicated in Fig. 4. The bottom of the bag will extend across the bottom of the carton.

After the measured charge of liquid has been delivered through the filling nozzle 41, the bag with its charge supported by the outer carton is passed on to the sealing station. During this transit movement, the foam in the head space 42 is constantly breaking. The time interval of transit of the charged containers between the filling and sealing stations may be such as to permit complete settling of the foam to take place. For example, if the containers are being filled at the rate of 30 per minute and the space between the filling and sealing stations is such that there are 6 charged containers traveling therebetween at any time, each container, after being charged, will have 12 seconds for the foam to settle before it reaches the sealing station. This is ordinarily sufficient time to effect the complete settling of the foam on milk.

Just before the lips 18 and 19 are sealed at the sealing station, the air is expelled from the head space. This may be done by pressing inwardly the opposite sides of the carton to force the liquid therein upwardly into the head space 42 and raise the liquid level, and thereby expel the air in said head space through the opening 20. At the same time the flap 31 and the attached pleat may, if desired, be pulled or bent outwardly to better insure the escape of all of the air as indicated in Fig. 5. While the carton is subjected to this liquid displacing pressure, the opposing lips 18 and 19 are heat sealed together along a narrow strip 44 near the base of said lips and substantially at or but slightly above the raised liquid level. This operation may be effected as shown in Fig. 5 by the use of a platen 45 and a movable heated pressure member 46 having an edge 47 adapted to press along the predetermined seal line having a V-shaped portion intermediate of its ends as indicated in dotted lines in Figs. 9 and 13. Since the two lips 18 and 19 are lined on their faces with Pliofilm, this heat sealing operation forms a liquid-tight autogenous bond between said lips. By sealing along a line or narrow strip 44 of the shape indicated, the seal may be more effectively broken when it is desired to dispense the contents. In cases where the material of the bag or its coating or inner lining is not made of thermoplastic material, a strip of thermoplastic material may be previously secured to the lips along the desired seal line and said strip heated and pressed to seal the lips together along said line.

After the lips 18 and 19 have been heat sealed together in air-tight relationship, the pressure on the sides of the carton is relieved so that the liquid will drop to its normal level E. This operation will cause the top of the flexible bag 10 to fold inwardly over the normal level of the liquid as shown in Fig. 6 due to the external atmospheric pressure. The closure flaps may then be folded into closure position.

Another method of eliminating the head space from the bag after the bag has been filled, is to press the flap 35 downwardly over the upper portion 42 of the bag directly after the filling operation and before the filling nozzle is withdrawn. This operation causes the head space portion of the bag to be deflated and also causes the collapse of the bubbles or foam therein. Those bubbles which are not collapsed or expelled by this infolding action will be forced back into the filling mechanism through the filling nozzle.

Instead of infolding the upper portion of the expansible bag directly after the filling operation and before the filling nozzle is withdrawn, the foam may be made to settle into liquid form before the infolding of said bag as already described with reference to Fig. 5. The flap 35 is pressed sufficiently downwardly by the fingers to cause the displacement of the liquid in the bag into the portions of the bag which have not been infolded as shown in Fig. 7, so that substantially all of the air in the bag is expelled. While in this position the lips 18 and 19 are heat sealed in the manner already described. Upon the completion of the sealing operation, the finger pressure on the bag is relieved and the liquid permitted to return to its normal level. Another method of eliminating the head space from the bag is by injecting a charge of water vapors such as steam in the head space as already described.

After the two lips 18 and 19 are heat sealed together the flap 31 with the sealed lips secured thereto is folded inwardly across the top of the carton along its score line 32, the flap 35 is folded over the flap 31, and the outer end flaps 36 and 37 are folded over the two flaps 31 and 35 in the position shown in Fig. 8. The two inner flaps 31 and 35 are of such length that when they are folded across the top of the carton, the flap 35 will overlap the flap 31 shown in Fig. 8. The flaps may be held in closure position during storage and/or transportation by a suitable paster, interlocking tabs, or staple, or in any other suitable manner.

It is seen that the necessary head space to receive the foam during the filling operation permits the bag to be filled substantially to the full capacity of the carton, so that during transportation there is little or no surging or pounding of the walls of the carton by the liquid. This construction not only materially reduces the bulk of the carton but also serves to more effectively withstand the disruptive action caused by the ordinary shipping and handling of the carton. Also, the reduction of air in the bag reduces the degree of spoilage of certain liquids such as milk or cream. Furthermore, when the carton is closed, the seal 44 will extend across the top of the bag. This seal 44 therefore will not be subjected to as great a disruptive action during the handling of the container as would be the case if said seal extended along the corner of the carton. In the latter case, the action of the liquid in the bag might tend to break or peel the seal 44 open. With the present construction the seal 44 may be made extremely weak so that it can be easily broken by a simple finger manipulation when it is desired to pour out the contents of the container. This finger manipulation merely consists in pressing the walls of the carton 26 and 28 inwardly to effect the outward bulging of the wall 27 and the flap 31. If desired, this finger manipulation may be supplemented by a pulling of the portion 21 away from the flap 31. This manipulation not only causes the breaking of the seal 44 but the bowing and separating of the two lips 18 and 19.

After the seal has been broken, the liquid therefrom may be dispensed in a manner indicated in Fig. 9. After the desired amount of liquid has been dispensed, the upper closure flaps of the carton may be closed, with the flap 35 overlapping the flap 31 and the tabs 38 and 39 tucked underneath said flap 35. In this condition, the container may be stored away until further use.

So far as concerns certain features of my invention, it is not essential that the bag be provided with a pleat. The bag may be similar in all respects to that above described, with the exception that the pleat may be omitted. The top end of the bag, instead of being completely sealed across the width along the line C as shown in Fig. 10, may be sealed only across the portions having the infolded side walls, but without any seal directly between the walls 11 and 13. This unsealed portion may constitute the filling opening as indicated in Fig. 14. After the bag has been filled through the nozzle 41, the latter is withdrawn and the sealing operation completed. Such a bag would be made over-sized, that is with a certain amount of head space at the top after the delivery of a predetermined or measured volume of liquid. The lower end of the bag may be compressed or any one of the walls deformed or pressed inwardly to force the liquid up into the head space and closely adjacent to the opening, and while at that level the walls 11 and 13 may be sealed together. After the release of the pressure, the liquid level will drop and the upper portion of the bag will collapse to the liquid level, and the sealed bag will be completely filled by a volume of liquid less than that required to normally fill the bag when in unsealed condition.

This application is a division of my copending application, Serial No. 102,682, filed September 26, 1936, which became Patent No. 2,177,919, issued October 31, 1939, and in which the method herein described is claimed.

Having thus described my invention, what I claim as new and desire to secure by Letters Patent is:

1. A container including a carton having inner and outer flaps foldable to form an end closure, and a flexible bag therein having a side wall folded to form a pleat presenting a pair of juxtaposed parallel layers extending transversely of said side wall, said layers being disconnected along the outer edge or fold of the pleat, whereby upon separating said layers there is formed an opening for said bag, said pleat being located adjacent to one of said inner flaps and connected thereto to form a foldable unit therewith, the base portion of said pleat being positioned a substantial distance above the closure end of the carton so that when the bag is fully expanded a substantial head space is formed above the closure end of the carton.

2. A container including a carton of rectangular cross-section having inner and outer flaps extending respectively from the four walls of the carton and foldable to form an end closure, one of said inner flaps having a length approximately equal to one-half the distance between the carton wall from which it extends, to the opposite carton wall, and an inner flexible bag having a sealed upper end, and having a portion at one side thereof presenting an outlet and secured to said inner flap, with the base of said portion at a substantial distance above the closure end of the carton, whereby when said bag is fully distended it will present a substantial sealed head space above the closure end of the carton.

3. A container including a carton having inner and outer flaps foldable to form an end closure, and an inner normally flat distensible bag having a side wall thereof folded in the form of a pleat presenting a pair of juxtaposed parallel layers extending transversely of said side wall, said layers disconnected along the outer edge or fold of the pleat, whereby upon bowing said layers apart there is formed a filling and pouring mouth for said bag, said bag being secured to one of said inner flaps, the base of said pleat being disposed approximately midway between the outer edge of said latter flap and the fold line of said latter flap, whereby said bag when fully distended will present a substantial head space above the closure end of the carton.

4. A container comprising a carton having inner and outer flaps at one end to form a closure for said carton, and a normally flat distensible liquid-tight bag in said carton, said bag when in collapsed condition including a pair of substantially flat opposed walls and a multiplicity of infolds extending from each side of and between said walls, said infolds being comparatively narrow so that the inner longitudinal fold edges of said infolds are disposed at a substantial distance from the axis of the bag, said bag being secured to one of said flaps in such a position that when said bag is fully expanded and its upper end sealed, and the flaps are open, the bag will present a substantial sealed head space above the closure end of the carton and a wall of the head space will be supported by said flap.

5. A container comprising a carton having inner and outer flaps at one end to form a closure for said carton and a normally flat distensible liquid-tight bag in said carton and secured to one wall only of said carton, said bag when in collapsed condition including a pair of substantially flat opposed walls and a plurality of infolds extending from each side of and between said walls, said infolds extending to less than one-half the width of said flat walls, said flat walls and said infolds being secured together transversely of the bag across the width of the infolds whereby the flat walls may be separated to form a filling or pouring opening between said infolds.

6. A container comprising a carton having inner and outer flaps at one end to form a closure for said carton and a normally flat distensible liquid-tight bag in said carton and secured to one wall only of said carton, said bag when in collapsed condition including a pair of substantially flat opposed walls and a plurality of infolds extending from each side of and between said walls, said infolds extending to less than one-half the width of said flat walls, said flat walls and said infolds being secured together transversely of the bag across the width of the infolds whereby the flat walls may be separated to form a filling or pouring opening between said infolds, and one of said flat walls being secured to one of said flaps whereby a portion of the bag is raised above the top of the carton upon opening said flaps.

7. A container including a carton having inner and outer flaps foldable to form an end closure, and a flexible bag therein having a side wall folded to form a pleat presenting a pair of juxtaposed parallel layers extending transversely of said side wall, said layers being disconnected along the outer edge or fold of the pleat, whereby upon separating said layers there is formed an opening for said bag, said pleat being located adjacent to one of said inner flaps and connected thereto to form a foldable unit therewith, the base portion of said pleat being positioned a substantial distance above the closure end of the carton so that when the bag is fully expanded a substantial head space is formed above the closure end of the carton, and said head space and said inner flap having said outer flap superposed thereon when the carton is closed.

CLARENCE W. VOGT.